United States Patent [19]

Guttag

[11] Patent Number: 4,566,075
[45] Date of Patent: Jan. 21, 1986

[54] TABLE LOOKUP MULTIPLIER EMPLOYING COMPRESSED DATA READ ONLY MEMORY

[75] Inventor: Karl M. Guttag, Houston, Tex.

[73] Assignee: Texas Instruments Incorporated, Dallas, Tex.

[21] Appl. No.: 451,663

[22] Filed: Dec. 21, 1982

[51] Int. Cl.⁴ .............................................. G06F 7/52
[52] U.S. Cl. ................................... 364/754; 364/756; 364/757; 364/759
[58] Field of Search ............... 364/754, 755, 756, 757, 364/759, 760

[56] References Cited

U.S. PATENT DOCUMENTS 4,390,961  6/1983  Negi et al. .......................... 364/756

OTHER PUBLICATIONS

Brubaker et al., "Multiplication Using Logarithms Implemented with Read-Only Memory", *IEEE Trans. on Computers*, vol. C-24, No. 8, Aug. 1975, pp. 761-765.
Webster et al., "B.C.D. Multipliers", *Computers & Digital Techniques*, vol. 2, No. 5, pp. 226-230.
Hemel, "Making Small ROM's do Math Quickly, Cheaply & Easily", *Electronics*, May 11, 1970, pp. 104-111.
Bywater, "Error Reduction in ROM Multipliers", *Electronic Engineering* vol. 49, No. 593, Jun. 1977, p. 17.
Maholick, "Fast BCD Multiplication Logic", *IBM Tech. Disclosure Bulletin*, vol. 20, No. 2, Jul. 1977, pp. 712-715.
Kaiser "Digital Filters for High Speed Data Processing", *RCA Advanced Technology Labs*, Camden, N.J., Technical Report AFAL-TR-70-204, Sep. 1970, pp. 7-1 thru 7-20.

*Primary Examiner*—David H. Malzahn
*Attorney, Agent, or Firm*—Robert D. Marshall, Jr.; N. Rhys Merrett; Melvin Sharp

[57] ABSTRACT

A multiplier circuit including a read-only memory containing a table of products for digits of a multiplicand and multiplier. The multiplier circuit will produce the product when a multiplicand digit and a multiplier digit are input. The contents of the memory has been reduced such that while the multiplicand and multiplier digits will all produce the proper product, the amount of actual bit information stored in the memory is less than that of the total of bits in the total number of products. Another embodiment of the present invention is disclosed that includes several digits of a multiplier and a single digit of a multiplicand placed into a single memory containing products of these multiplier/multiplicand digits. This memory has been reduced but will simultaneously produce the products of the multiplicand with all input multipliers.

9 Claims, 10 Drawing Figures

| ADDRESS | 1 | 2 | 3 | 4 |
|---|---|---|---|---|
| 0 | 0 | 1 | 0 | 1 |
| 1 | 1 | 0 | 0 | 0 |
| 2 | 0 | 1 | 0 | 0 |
| 3 | 0 | 0 | 1 | 1 |
| 4 | 0 | 0 | 0 | 0 |
| 5 | 1 | 0 | 0 | 0 |
| 6 | 0 | 0 | 0 | 1 |
| 7 | 1 | 0 | 0 | 0 |
| 8 | 0 | 1 | 0 | 0 |
| 9 | 0 | 1 | 0 | 0 |
| 10 | 0 | 0 | 0 | 0 |
| 11 | 0 | 0 | 0 | 0 |

*Fig. 1*

A ROM "BUBBLE"   THE TRANSISTOR CONNECTION

| ROW | COL | 4 | 3 | 2 | 1 | 4 | 3 | 2 | 1 |
|---|---|---|---|---|---|---|---|---|---|
|   |   | CARRY | | | | SUM | | | |
| 0 | 0 | 0 | 0 | 0 | 0 | 0 | 0 | 0 | 0 |
| 0 | 1 | 0 | 0 | 0 | 0 | 0 | 0 | 0 | 0 |
| 0 | 2 | 0 | 0 | 0 | 0 | 0 | 0 | 0 | 0 |
| 0 | 3 | 0 | 0 | 0 | 0 | 0 | 0 | 0 | 0 |
| 0 | 4 | 0 | 0 | 0 | 0 | 0 | 0 | 0 | 0 |
| 0 | 5 | 0 | 0 | 0 | 0 | 0 | 0 | 0 | 0 |
| 0 | 6 | 0 | 0 | 0 | 0 | 0 | 0 | 0 | 0 |
| 0 | 7 | 0 | 0 | 0 | 0 | 0 | 0 | 0 | 0 |
| 0 | 8 | 0 | 0 | 0 | 0 | 0 | 0 | 0 | 0 |
| 0 | 9 | 0 | 0 | 0 | 0 | 0 | 0 | 0 | 0 |
| 0 | A | 0 | 0 | 0 | 0 | 0 | 0 | 0 | 0 |
| 0 | B | 0 | 0 | 0 | 0 | 0 | 0 | 0 | 0 |
| 0 | C | 0 | 0 | 0 | 0 | 0 | 0 | 0 | 0 |
| 0 | D | 0 | 0 | 0 | 0 | 0 | 0 | 0 | 0 |
| 0 | E | 0 | 0 | 0 | 0 | 0 | 0 | 0 | 0 |
| 0 | F | 0 | 0 | 0 | 0 | 0 | 0 | 0 | 0 |

H1

| ROW | COL | 4 | 3 | 2 | 1 | 4 | 3 | 2 | 1 |
|---|---|---|---|---|---|---|---|---|---|
|   |   | CARRY | | | | SUM | | | |
| 1 | 0 | 0 | 0 | 0 | 0 | 0 | 0 | 0 | 0 |
| 1 | 1 | 0 | 0 | 0 | 0 | 0 | 0 | 0 | 1 |
| 1 | 2 | 0 | 0 | 0 | 0 | 0 | 0 | 1 | 0 |
| 1 | 3 | 0 | 0 | 0 | 0 | 0 | 0 | 1 | 1 |
| 1 | 4 | 0 | 0 | 0 | 0 | 0 | 1 | 0 | 0 |
| 1 | 5 | 0 | 0 | 0 | 0 | 0 | 1 | 0 | 1 |
| 1 | 6 | 0 | 0 | 0 | 0 | 0 | 1 | 1 | 0 |
| 1 | 7 | 0 | 0 | 0 | 0 | 0 | 1 | 1 | 1 |
| 1 | 8 | 0 | 0 | 0 | 0 | 1 | 0 | 0 | 0 |
| 1 | 9 | 0 | 0 | 0 | 0 | 1 | 0 | 0 | 1 |
| 1 | A | 0 | 0 | 0 | 0 | 1 | 0 | 1 | 0 |
| 1 | B | 0 | 0 | 0 | 0 | 1 | 0 | 1 | 1 |
| 1 | C | 0 | 0 | 0 | 0 | 1 | 1 | 0 | 0 |
| 1 | D | 0 | 0 | 0 | 0 | 1 | 1 | 0 | 1 |
| 1 | E | 0 | 0 | 0 | 0 | 1 | 1 | 1 | 0 |
| 1 | F | 0 | 0 | 0 | 0 | 1 | 1 | 1 | 1 |

H2

| ROW | COL | 4 | 3 | 2 | 1 | 4 | 3 | 2 | 1 |
|---|---|---|---|---|---|---|---|---|---|
|   |   | CARRY | | | | SUM | | | |
| 2 | 0 | 0 | 0 | 0 | 0 | 0 | 0 | 0 | 0 |
| 2 | 1 | 0 | 0 | 0 | 0 | 0 | 0 | 1 | 0 |
| 2 | 2 | 0 | 0 | 0 | 0 | 0 | 1 | 0 | 0 |
| 2 | 3 | 0 | 0 | 0 | 0 | 0 | 1 | 1 | 0 |
| 2 | 4 | 0 | 0 | 0 | 0 | 1 | 0 | 0 | 0 |
| 2 | 5 | 0 | 0 | 0 | 0 | 1 | 0 | 1 | 0 |
| 2 | 6 | 0 | 0 | 0 | 0 | 1 | 1 | 0 | 0 |
| 2 | 7 | 0 | 0 | 0 | 0 | 1 | 1 | 1 | 0 |
| 2 | 8 | 0 | 0 | 0 | 1 | 0 | 0 | 0 | 0 |
| 2 | 9 | 0 | 0 | 0 | 1 | 0 | 0 | 1 | 0 |
| 2 | A | 0 | 0 | 0 | 1 | 0 | 1 | 0 | 0 |
| 2 | B | 0 | 0 | 0 | 1 | 0 | 1 | 1 | 0 |
| 2 | C | 0 | 0 | 0 | 1 | 1 | 0 | 0 | 0 |
| 2 | D | 0 | 0 | 0 | 1 | 1 | 0 | 1 | 0 |
| 2 | E | 0 | 0 | 0 | 1 | 1 | 1 | 0 | 0 |
| 2 | F | 0 | 0 | 0 | 1 | 1 | 1 | 1 | 0 |

H3

| ROW | COL | 4 | 3 | 2 | 1 | 4 | 3 | 2 | 1 |
|---|---|---|---|---|---|---|---|---|---|
|   |   | CARRY | | | | SUM | | | |
| 3 | 0 | 0 | 0 | 0 | 0 | 0 | 0 | 0 | 0 |
| 3 | 1 | 0 | 0 | 0 | 0 | 0 | 0 | 1 | 1 |
| 3 | 2 | 0 | 0 | 0 | 0 | 0 | 1 | 1 | 0 |
| 3 | 3 | 0 | 0 | 0 | 0 | 1 | 0 | 0 | 1 |
| 3 | 4 | 0 | 0 | 0 | 0 | 1 | 1 | 0 | 0 |
| 3 | 5 | 0 | 0 | 0 | 0 | 1 | 1 | 1 | 1 |
| 3 | 6 | 0 | 0 | 0 | 1 | 0 | 0 | 1 | 0 |
| 3 | 7 | 0 | 0 | 0 | 1 | 0 | 1 | 0 | 1 |
| 3 | 8 | 0 | 0 | 0 | 1 | 1 | 0 | 0 | 0 |
| 3 | 9 | 0 | 0 | 0 | 1 | 1 | 0 | 1 | 1 |
| 3 | A | 0 | 0 | 0 | 1 | 1 | 1 | 1 | 0 |
| 3 | B | 0 | 0 | 1 | 0 | 0 | 0 | 0 | 1 |
| 3 | C | 0 | 0 | 1 | 0 | 0 | 1 | 0 | 0 |
| 3 | D | 0 | 0 | 1 | 0 | 0 | 1 | 1 | 1 |
| 3 | E | 0 | 0 | 1 | 0 | 1 | 0 | 1 | 0 |
| 3 | F | 0 | 0 | 1 | 0 | 1 | 1 | 0 | 1 |

H4

| ROW | COL | 4 | 3 | 2 | 1 | 4 | 3 | 2 | 1 |
|---|---|---|---|---|---|---|---|---|---|
|   |   | CARRY | | | | SUM | | | |
| 4 | 0 | 0 | 0 | 0 | 0 | 0 | 0 | 0 | 0 |
| 4 | 1 | 0 | 0 | 0 | 0 | 0 | 1 | 0 | 0 |
| 4 | 2 | 0 | 0 | 0 | 0 | 1 | 0 | 0 | 0 |
| 4 | 3 | 0 | 0 | 0 | 0 | 1 | 1 | 0 | 0 |
| 4 | 4 | 0 | 0 | 0 | 1 | 0 | 0 | 0 | 0 |
| 4 | 5 | 0 | 0 | 0 | 1 | 0 | 1 | 0 | 0 |
| 4 | 6 | 0 | 0 | 0 | 1 | 1 | 0 | 0 | 0 |
| 4 | 7 | 0 | 0 | 0 | 1 | 1 | 1 | 0 | 0 |
| 4 | 8 | 0 | 0 | 1 | 0 | 0 | 0 | 0 | 0 |
| 4 | 9 | 0 | 0 | 1 | 0 | 0 | 1 | 0 | 0 |
| 4 | A | 0 | 0 | 1 | 0 | 1 | 0 | 0 | 0 |
| 4 | B | 0 | 0 | 1 | 0 | 1 | 1 | 0 | 0 |
| 4 | C | 0 | 0 | 1 | 1 | 0 | 0 | 0 | 0 |
| 4 | D | 0 | 0 | 1 | 1 | 0 | 1 | 0 | 0 |
| 4 | E | 0 | 0 | 1 | 1 | 1 | 0 | 0 | 0 |
| 4 | F | 0 | 0 | 1 | 1 | 1 | 1 | 0 | 0 |

H5

| ROW | COL | 4 | 3 | 2 | 1 | 4 | 3 | 2 | 1 |
|---|---|---|---|---|---|---|---|---|---|
|   |   | CARRY | | | | SUM | | | |
| 5 | 0 | 0 | 0 | 0 | 0 | 0 | 0 | 0 | 0 |
| 5 | 1 | 0 | 0 | 0 | 0 | 0 | 1 | 0 | 1 |
| 5 | 2 | 0 | 0 | 0 | 0 | 1 | 0 | 1 | 0 |
| 5 | 3 | 0 | 0 | 0 | 0 | 1 | 1 | 1 | 1 |
| 5 | 4 | 0 | 0 | 0 | 1 | 0 | 1 | 0 | 0 |
| 5 | 5 | 0 | 0 | 0 | 1 | 1 | 0 | 0 | 1 |
| 5 | 6 | 0 | 0 | 0 | 1 | 1 | 1 | 0 | 1 |
| 5 | 7 | 0 | 0 | 1 | 0 | 0 | 0 | 1 | 1 |
| 5 | 8 | 0 | 0 | 1 | 0 | 1 | 0 | 0 | 0 |
| 5 | 9 | 0 | 0 | 1 | 0 | 1 | 1 | 0 | 1 |
| 5 | A | 0 | 0 | 1 | 1 | 0 | 0 | 1 | 0 |
| 5 | B | 0 | 0 | 1 | 1 | 0 | 1 | 1 | 1 |
| 5 | C | 0 | 0 | 1 | 1 | 1 | 1 | 0 | 0 |
| 5 | D | 0 | 1 | 0 | 0 | 0 | 0 | 0 | 1 |
| 5 | E | 0 | 1 | 0 | 0 | 0 | 1 | 1 | 0 |
| 5 | F | 0 | 1 | 0 | 0 | 1 | 0 | 1 | 1 |

H6

| ROW | COL | 4 | 3 | 2 | 1 | 4 | 3 | 2 | 1 |
|---|---|---|---|---|---|---|---|---|---|
|   |   | CARRY | | | | SUM | | | |
| 6 | 0 | 0 | 0 | 0 | 0 | 0 | 0 | 0 | 0 |
| 6 | 1 | 0 | 0 | 0 | 0 | 0 | 1 | 1 | 0 |
| 6 | 2 | 0 | 0 | 0 | 0 | 1 | 1 | 0 | 0 |
| 6 | 3 | 0 | 0 | 0 | 1 | 0 | 0 | 1 | 0 |
| 6 | 4 | 0 | 0 | 0 | 1 | 1 | 0 | 0 | 0 |
| 6 | 5 | 0 | 0 | 0 | 1 | 1 | 1 | 1 | 0 |
| 6 | 6 | 0 | 0 | 1 | 0 | 0 | 1 | 0 | 0 |
| 6 | 7 | 0 | 0 | 1 | 0 | 1 | 0 | 1 | 0 |
| 6 | 8 | 0 | 0 | 1 | 1 | 0 | 0 | 0 | 0 |
| 6 | 9 | 0 | 0 | 1 | 1 | 0 | 1 | 1 | 0 |
| 6 | A | 0 | 0 | 1 | 1 | 1 | 1 | 0 | 0 |
| 6 | B | 0 | 1 | 0 | 0 | 0 | 0 | 1 | 0 |
| 6 | C | 0 | 1 | 0 | 0 | 1 | 0 | 0 | 0 |
| 6 | D | 0 | 1 | 0 | 0 | 1 | 1 | 1 | 0 |
| 6 | E | 0 | 1 | 0 | 1 | 0 | 1 | 0 | 0 |
| 6 | F | 0 | 1 | 0 | 1 | 1 | 0 | 1 | 0 |

H7

| ROW | COL | 4 | 3 | 2 | 1 | 4 | 3 | 2 | 1 |
|---|---|---|---|---|---|---|---|---|---|
|   |   | CARRY | | | | SUM | | | |
| 7 | 0 | 0 | 0 | 0 | 0 | 0 | 0 | 0 | 0 |
| 7 | 1 | 0 | 0 | 0 | 0 | 0 | 1 | 1 | 1 |
| 7 | 2 | 0 | 0 | 0 | 0 | 1 | 1 | 1 | 0 |
| 7 | 3 | 0 | 0 | 0 | 1 | 0 | 1 | 0 | 1 |
| 7 | 4 | 0 | 0 | 0 | 1 | 1 | 1 | 0 | 0 |
| 7 | 5 | 0 | 0 | 1 | 0 | 0 | 0 | 1 | 1 |
| 7 | 6 | 0 | 0 | 1 | 0 | 1 | 0 | 1 | 0 |
| 7 | 7 | 0 | 0 | 1 | 1 | 0 | 0 | 0 | 1 |
| 7 | 8 | 0 | 0 | 1 | 1 | 1 | 0 | 0 | 0 |
| 7 | 9 | 0 | 0 | 1 | 1 | 1 | 1 | 1 | 1 |
| 7 | A | 0 | 1 | 0 | 0 | 0 | 1 | 1 | 0 |
| 7 | B | 0 | 1 | 0 | 0 | 1 | 1 | 0 | 1 |
| 7 | C | 0 | 1 | 0 | 1 | 0 | 1 | 0 | 0 |
| 7 | D | 0 | 1 | 0 | 1 | 1 | 0 | 1 | 1 |
| 7 | E | 0 | 1 | 1 | 0 | 0 | 0 | 1 | 0 |
| 7 | F | 0 | 1 | 1 | 0 | 1 | 0 | 0 | 1 |

H8

| ROW | COL | 4 | 3 | 2 | 1 | 4 | 3 | 2 | 1 |
|---|---|---|---|---|---|---|---|---|---|
|   |   | CARRY | | | | SUM | | | |
| 8 | 0 | 0 | 0 | 0 | 0 | 0 | 0 | 0 | 0 |
| 8 | 1 | 0 | 0 | 0 | 0 | 1 | 0 | 0 | 0 |
| 8 | 2 | 0 | 0 | 0 | 1 | 0 | 0 | 0 | 0 |
| 8 | 3 | 0 | 0 | 0 | 1 | 1 | 0 | 0 | 0 |
| 8 | 4 | 0 | 0 | 1 | 0 | 0 | 0 | 0 | 0 |
| 8 | 5 | 0 | 0 | 1 | 0 | 1 | 0 | 0 | 0 |
| 8 | 6 | 0 | 0 | 1 | 1 | 0 | 0 | 0 | 0 |
| 8 | 7 | 0 | 0 | 1 | 1 | 1 | 0 | 0 | 0 |
| 8 | 8 | 0 | 1 | 0 | 0 | 0 | 0 | 0 | 0 |
| 8 | 9 | 0 | 1 | 0 | 0 | 1 | 0 | 0 | 0 |
| 8 | A | 0 | 1 | 0 | 1 | 0 | 0 | 0 | 0 |
| 8 | B | 0 | 1 | 0 | 1 | 1 | 0 | 0 | 0 |
| 8 | C | 0 | 1 | 1 | 0 | 0 | 0 | 0 | 0 |
| 8 | D | 0 | 1 | 1 | 0 | 1 | 0 | 0 | 0 |
| 8 | E | 0 | 1 | 1 | 1 | 0 | 0 | 0 | 0 |
| 8 | F | 0 | 1 | 1 | 1 | 1 | 0 | 0 | 0 |

| ROW | COL | \ | CARRY | \ | \ | \ | SUM | \ | \ |
|---|---|---|---|---|---|---|---|---|---|
| | | 4 | 3 | 2 | 1 | 4 | 3 | 2 | 1 |
| 9 | 0 | 0 | 0 | 0 | 0 | 0 | 0 | 0 | 0 |
| 9 | 1 | 0 | 0 | 0 | 0 | 1 | 0 | 0 | 1 |
| 9 | 2 | 0 | 0 | 0 | 1 | 0 | 0 | 1 | 0 |
| 9 | 3 | 0 | 0 | 0 | 1 | 1 | 0 | 1 | 1 |
| 9 | 4 | 0 | 0 | 1 | 0 | 0 | 1 | 0 | 0 |
| 9 | 5 | 0 | 0 | 1 | 0 | 1 | 1 | 0 | 1 |
| 9 | 6 | 0 | 0 | 1 | 1 | 0 | 1 | 1 | 0 |
| 9 | 7 | 0 | 0 | 1 | 1 | 1 | 1 | 1 | 1 |
| 9 | 8 | 0 | 1 | 0 | 0 | 1 | 0 | 0 | 0 |
| 9 | 9 | 0 | 1 | 0 | 1 | 0 | 0 | 0 | 1 |
| 9 | A | 0 | 1 | 0 | 1 | 1 | 0 | 1 | 0 |
| 9 | B | 0 | 1 | 1 | 0 | 0 | 0 | 1 | 1 |
| 9 | C | 0 | 1 | 1 | 0 | 1 | 1 | 0 | 0 |
| 9 | D | 0 | 1 | 1 | 1 | 0 | 1 | 0 | 1 |
| 9 | E | 0 | 1 | 1 | 1 | 1 | 1 | 1 | 0 |
| 9 | F | 1 | 0 | 0 | 0 | 0 | 0 | 0 | 1 |

H10

| ROW | COL | 4 | 3 | 2 | 1 | 4 | 3 | 2 | 1 |
|---|---|---|---|---|---|---|---|---|---|
| A | 0 | 0 | 0 | 0 | 0 | 0 | 0 | 0 | 0 |
| A | 1 | 0 | 0 | 0 | 0 | 1 | 0 | 1 | 0 |
| A | 2 | 0 | 0 | 0 | 1 | 0 | 1 | 0 | 0 |
| A | 3 | 0 | 0 | 0 | 1 | 1 | 1 | 1 | 0 |
| A | 4 | 0 | 0 | 1 | 0 | 1 | 0 | 0 | 0 |
| A | 5 | 0 | 0 | 1 | 1 | 0 | 0 | 1 | 0 |
| A | 6 | 0 | 0 | 1 | 1 | 1 | 1 | 0 | 0 |
| A | 7 | 0 | 1 | 0 | 0 | 0 | 1 | 1 | 0 |
| A | 8 | 0 | 1 | 0 | 1 | 0 | 0 | 0 | 0 |
| A | 9 | 0 | 1 | 0 | 1 | 1 | 0 | 1 | 0 |
| A | A | 0 | 1 | 1 | 0 | 0 | 1 | 0 | 0 |
| A | B | 0 | 1 | 1 | 0 | 1 | 1 | 1 | 0 |
| A | C | 0 | 1 | 1 | 1 | 1 | 0 | 0 | 0 |
| A | D | 1 | 0 | 0 | 0 | 0 | 0 | 1 | 0 |
| A | E | 1 | 0 | 0 | 0 | 1 | 1 | 0 | 0 |
| A | F | 1 | 0 | 0 | 1 | 0 | 1 | 1 | 0 |

H11

| ROW | COL | 4 | 3 | 2 | 1 | 4 | 3 | 2 | 1 |
|---|---|---|---|---|---|---|---|---|---|
| B | 0 | 0 | 0 | 0 | 0 | 0 | 0 | 0 | 0 |
| B | 1 | 0 | 0 | 0 | 0 | 1 | 0 | 1 | 1 |
| B | 2 | 0 | 0 | 0 | 1 | 0 | 1 | 1 | 0 |
| B | 3 | 0 | 0 | 1 | 0 | 0 | 0 | 0 | 1 |
| B | 4 | 0 | 0 | 1 | 0 | 1 | 1 | 0 | 0 |
| B | 5 | 0 | 0 | 1 | 1 | 0 | 1 | 1 | 1 |
| B | 6 | 0 | 1 | 0 | 0 | 0 | 0 | 1 | 0 |
| B | 7 | 0 | 1 | 0 | 0 | 1 | 1 | 0 | 1 |
| B | 8 | 0 | 1 | 0 | 1 | 1 | 0 | 0 | 0 |
| B | 9 | 0 | 1 | 1 | 0 | 0 | 0 | 1 | 1 |
| B | A | 0 | 1 | 1 | 0 | 1 | 1 | 1 | 0 |
| B | B | 0 | 1 | 1 | 1 | 1 | 0 | 0 | 1 |
| B | C | 1 | 0 | 0 | 0 | 0 | 1 | 0 | 0 |
| B | D | 1 | 0 | 0 | 0 | 1 | 1 | 1 | 1 |
| B | E | 1 | 0 | 0 | 1 | 1 | 0 | 1 | 0 |
| B | F | 1 | 0 | 1 | 0 | 0 | 1 | 0 | 1 |

H12

| ROW | COL | 4 | 3 | 2 | 1 | 4 | 3 | 2 | 1 |
|---|---|---|---|---|---|---|---|---|---|
| C | 0 | 0 | 0 | 0 | 0 | 0 | 0 | 0 | 0 |
| C | 1 | 0 | 0 | 0 | 0 | 1 | 1 | 0 | 0 |
| C | 2 | 0 | 0 | 0 | 1 | 1 | 0 | 0 | 0 |
| C | 3 | 0 | 0 | 1 | 0 | 0 | 1 | 0 | 0 |
| C | 4 | 0 | 0 | 1 | 1 | 0 | 0 | 0 | 0 |
| C | 5 | 0 | 0 | 1 | 1 | 1 | 1 | 0 | 0 |
| C | 6 | 0 | 1 | 0 | 0 | 1 | 0 | 0 | 0 |
| C | 7 | 0 | 1 | 0 | 1 | 0 | 1 | 0 | 0 |
| C | 8 | 0 | 1 | 1 | 0 | 0 | 0 | 0 | 0 |
| C | 9 | 0 | 1 | 1 | 0 | 1 | 1 | 0 | 0 |
| C | A | 0 | 1 | 1 | 1 | 1 | 0 | 0 | 0 |
| C | B | 1 | 0 | 0 | 0 | 0 | 1 | 0 | 0 |
| C | C | 1 | 0 | 0 | 1 | 0 | 0 | 0 | 0 |
| C | D | 1 | 0 | 0 | 1 | 1 | 1 | 0 | 0 |
| C | E | 1 | 0 | 1 | 0 | 1 | 0 | 0 | 0 |
| C | F | 1 | 0 | 1 | 1 | 0 | 1 | 0 | 0 |

H13

| ROW | COL | 4 | 3 | 2 | 1 | 4 | 3 | 2 | 1 |
|---|---|---|---|---|---|---|---|---|---|
| D | 0 | 0 | 0 | 0 | 0 | 0 | 0 | 0 | 0 |
| D | 1 | 0 | 0 | 0 | 0 | 1 | 1 | 0 | 1 |
| D | 2 | 0 | 0 | 0 | 1 | 1 | 0 | 1 | 0 |
| D | 3 | 0 | 0 | 1 | 0 | 0 | 1 | 1 | 1 |
| D | 4 | 0 | 0 | 1 | 1 | 0 | 1 | 0 | 0 |
| D | 5 | 0 | 1 | 0 | 0 | 0 | 0 | 0 | 1 |
| D | 6 | 0 | 1 | 0 | 0 | 1 | 1 | 1 | 0 |
| D | 7 | 0 | 1 | 0 | 1 | 1 | 0 | 1 | 1 |
| D | 8 | 0 | 1 | 1 | 0 | 1 | 0 | 0 | 0 |
| D | 9 | 0 | 1 | 1 | 1 | 0 | 1 | 0 | 1 |
| D | A | 1 | 0 | 0 | 0 | 0 | 0 | 1 | 0 |
| D | B | 1 | 0 | 0 | 0 | 1 | 1 | 1 | 1 |
| D | C | 1 | 0 | 0 | 1 | 1 | 1 | 0 | 0 |
| D | D | 1 | 0 | 1 | 0 | 1 | 0 | 0 | 1 |
| D | E | 1 | 0 | 1 | 1 | 0 | 1 | 1 | 0 |
| D | F | 1 | 1 | 0 | 0 | 0 | 0 | 1 | 1 |

H14

| ROW | COL | 4 | 3 | 2 | 1 | 4 | 3 | 2 | 1 |
|---|---|---|---|---|---|---|---|---|---|
| E | 0 | 0 | 0 | 0 | 0 | 0 | 0 | 0 | 0 |
| E | 1 | 0 | 0 | 0 | 0 | 1 | 1 | 1 | 0 |
| E | 2 | 0 | 0 | 0 | 1 | 1 | 1 | 0 | 0 |
| E | 3 | 0 | 0 | 1 | 0 | 1 | 0 | 1 | 0 |
| E | 4 | 0 | 0 | 1 | 1 | 1 | 0 | 0 | 0 |
| E | 5 | 0 | 1 | 0 | 0 | 0 | 1 | 1 | 0 |
| E | 6 | 0 | 1 | 0 | 1 | 0 | 1 | 0 | 0 |
| E | 7 | 0 | 1 | 1 | 0 | 0 | 0 | 1 | 0 |
| E | 8 | 0 | 1 | 1 | 1 | 0 | 0 | 0 | 0 |
| E | 9 | 0 | 1 | 1 | 1 | 1 | 1 | 1 | 0 |
| E | A | 1 | 0 | 0 | 0 | 1 | 1 | 0 | 0 |
| E | B | 1 | 0 | 0 | 1 | 1 | 0 | 1 | 0 |
| E | C | 1 | 0 | 1 | 0 | 1 | 0 | 0 | 0 |
| E | D | 1 | 0 | 1 | 1 | 0 | 1 | 1 | 0 |
| E | E | 1 | 1 | 0 | 0 | 0 | 1 | 0 | 0 |
| E | F | 1 | 1 | 0 | 1 | 0 | 0 | 1 | 0 |

H15

| ROW | COL | 4 | 3 | 2 | 1 | 4 | 3 | 2 | 1 |
|---|---|---|---|---|---|---|---|---|---|
| F | 0 | 0 | 0 | 0 | 0 | 0 | 0 | 0 | 0 |
| F | 1 | 0 | 0 | 0 | 0 | 1 | 1 | 1 | 1 |
| F | 2 | 0 | 0 | 0 | 1 | 1 | 1 | 1 | 0 |
| F | 3 | 0 | 0 | 1 | 0 | 1 | 1 | 0 | 1 |
| F | 4 | 0 | 0 | 1 | 1 | 1 | 1 | 0 | 0 |
| F | 5 | 0 | 1 | 0 | 0 | 1 | 0 | 1 | 1 |
| F | 6 | 0 | 1 | 0 | 1 | 1 | 0 | 1 | 0 |
| F | 7 | 0 | 1 | 1 | 0 | 1 | 0 | 0 | 1 |
| F | 8 | 0 | 1 | 1 | 1 | 1 | 0 | 0 | 0 |
| F | 9 | 1 | 0 | 0 | 0 | 0 | 1 | 1 | 1 |
| F | A | 1 | 0 | 0 | 1 | 0 | 1 | 1 | 0 |
| F | B | 1 | 0 | 1 | 0 | 0 | 1 | 0 | 1 |
| F | C | 1 | 0 | 1 | 1 | 0 | 1 | 0 | 0 |
| F | D | 1 | 1 | 0 | 0 | 0 | 0 | 1 | 1 |
| F | E | 1 | 1 | 0 | 1 | 0 | 0 | 1 | 0 |
| F | F | 1 | 1 | 1 | 0 | 0 | 0 | 0 | 1 |

TABLE LOOKUP MULTIPLIER EMPLOYING COMPRESSED DATA READ ONLY MEMORY

BACKGROUND

1. Field of the Invention

This invention relates to multiplication circuitry for digital computers and more specifically for multipliers in digital computers that employ table lookup techniques.

2. Description of the Prior Art

Multiplication in digital processors has traditionally been accomplished by two different methods. The first method requires that the digital processor execute an algorithm that takes the multiplicand and multiplier and combines them together by a series of additions and shift operations. Such a multiplication technique is described in *Production to Digital Computer Design*, by Herbert S. Sobel, published by Addison Westley Publishing Co., 1970. This method will provide products for hexidecimal numbers and with a further procedure provide products for binary coded decimal numbers.

The second method of multiplication is the use of the lookup table. That is, the multiplier and multiplicand are used as inputs to a table to lookup the result (i.e., the product of the specific multiplier and multiplicand). This method has the advantage of speed over the first method of executing an algorithm. However, the use of a lookup table also requires the storage of the multiplication table in the computer. If the multiplication table is stored in ROM (Read-Only Memory), the area required by this table may be quite large. It is an object of the present invention to provide a multiplication table with reduced table memory area requirements.

Recently, reduction techniques have been used to reduce the size of control logic and microcode storage memory in 16 bit microprocessors. One technique involves compression of the number of bits used in the read-only memory containing the microcode. In addressing microcode reduction, the standard approach has been to break the control word (i. e., the portion of the instruction word that specifies the operation of the microprocessor) into fields such as a jump field and a register control field where each field contains partially encoded control information together with the instruction register information to produce the control signals from the control ROM. An additional technique uses this partially encoded approach, plus it uses state redundancy with a two level control ROM structure to reduce the total ROM requirements. This two level approach generates a set of common control words (as is also the case for microsubroutine) for a horizontal store that is addressed by a second narrow control word (or vertical store). The primary control signals are those signals that directly control the machine (such as LATCH, LOAD SIGNALS, ALU (Arithmetic logic unit) CONTROL SIGNALS AND MICROJUMP ADDRESS), as opposed to secondary control signals that must be combined or decoded to form primary control signals. Assuming that the hardware to be controlled is relatively fixed, the number of primary control signals is fixed, and therefore the final result of any control structure is to generate this relatively fixed number of primary signals. In the past, the compressed control ROM technique has been used to reduce the total number of bits of information required in the control ROM to produce the fixed number of control signals. This technique and other techniques that will be discussed are applied to reduce and alter the traditional architecture of the multiplication table in a microprocessor or microcomputer.

SUMMARY

In accordance with the present invention, a multiplier circuit is disclosed that includes a first input circuit that receives at least one multiplicand digit, a second input circuit that receives at least one multiplier digit, a memory which is connected to the first and second input circuits and includes several groups of bits where each group represents a multiplication product of the digits. The total number of groups stored in the memory, however, is less than the total number of existing digit products. An output circuit is connected to the memory and provides the output product for the multiplier and multiplicand digits input.

In a further embodiment, a multiplier is provided that includes a first input circuit to receive a digit of the multiplicand, a second input circuit to receive a first digit of a multiplier and a third input circuit to receive a second digit of the multiplier. These input digits are coupled to a memory that includes several groups of bits where each group represents the multiplication products of the digits. The memory is connected to a first and second output circuits that simultaneously produce the products for the multiplicand times the first multiplier digit and the multiplicand times the second multiplier digit, respectively.

BRIEF DESCRIPTION OF THE DRAWINGS

The novel features believed characteristic of the invention are set forth in the appended claims. The invention itself, however, as well as other features and advantages thereof, will be best understood by reference to the detailed description which follows, read in conjunction with the accompany drawings, wherein:

FIG. 5 is a binary coded decimal multiplication table.

FIGS. 6A and 6B together form a hexidecimal multiplication table.

DESCRIPTION OF THE PREFERRED EMBODIMENT

Figure 1:
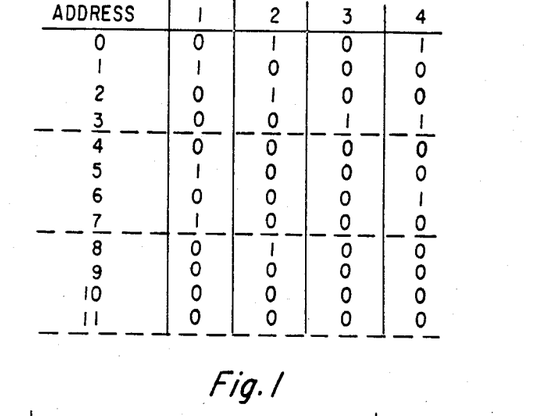
FIG. 1 is a state diagram illustrating the output of a read-only memory for a set of prescribed states.
Figure 2:
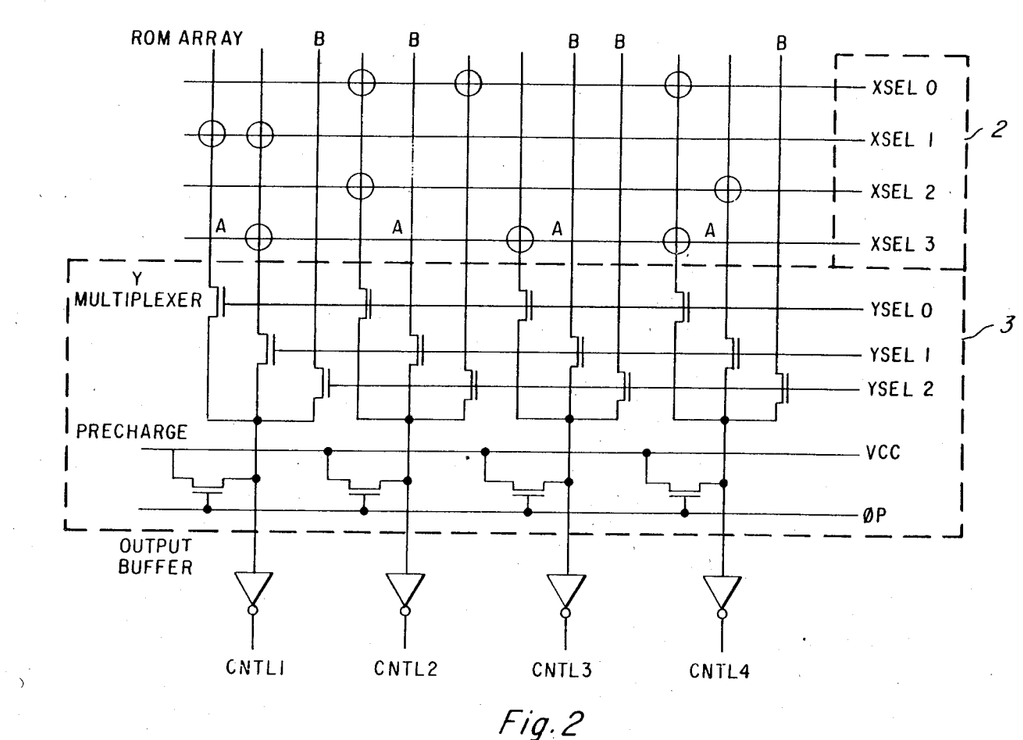
FIG. 2 is a schematic of the ROM of FIG. 1.
Figure 3:
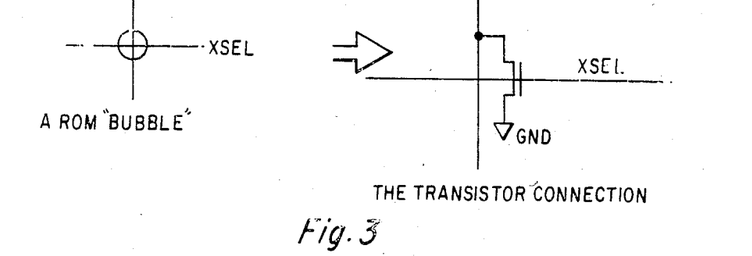
FIG. 3 is a schematic explanation of a ROM "bubble".

The present invention includes a multiplication table implemented in a read-only memory (ROM). The number of bits stored in the ROM is reduced by the use of a compression technique that is best explained by a simple example. For this example, a 12 state ROM with 4 primary outputs will be used. FIG. 1 illustrates the 12 states with their respective addresses and desired outputs. FIG. 2 shows a fully implemented ROM with an unencoded output word. The precharged transistors cause the inverting output buffers to go to a logical "0" on $0_p$. The "bubbles" in the ROM array (FIG. 3) indicate transistors discharging the input to the output buffers on a given X SEL through the selected Y multiplexer during $0_p$. A discharging "bubble" in the ROM array will cause a logical "1" output. The address of a word in the ROM is given by a 4 bit binary number A3, A2, A1, A0; the X SEL is the binary decode of A1, A0; and the Y SEL is a binary decode of A3, A2. For example, state 7 in FIG. 1 has A3, A2, A1, A0=0, 1,1,1 so that X SEL 3 and Y SEL 1 are active and thus the locations indicated by "A" in the ROM (FIG. 2) are selected resulting in an output on CNTL1, CNTL2, CNTL3 and CNTL4 of 1, 0, 0, 0, respectively.

The horizontal approach gives a very straightforward implementation of the outputs in FIG. 1 since the desired output signals are coded into the ROM as they appear in FIG. 1.

Figure 4:
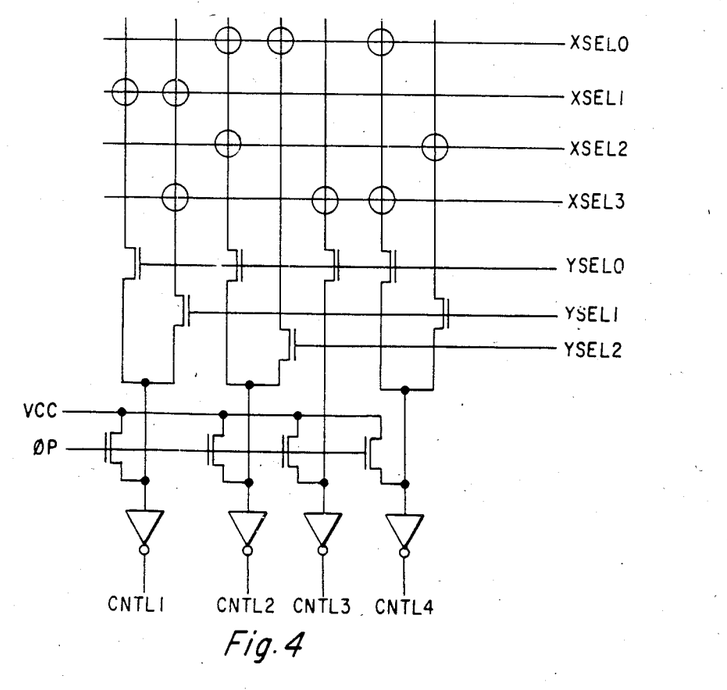
FIG. 4 is a schematic of a ROM after compression techniques have been implemented on the table data.

The compression technique for the ROM takes advantage of the ROM design's ability to modify this ROM configuration from that of a standard ROM. Referring to FIG. 2, it can be seen that certain columns of bits indicated by "B's" will not discharge the input to the output buffer regardless of the X SEL of the ROW decode 2 for the particular Y SEL 2 of the column decode 3. For example, if Y SEL occurs then CNTL 1 will be off (logical "0"). Since these columns have no "bubbles", they cannot activate the output; this column of ROM and the associated Y multiplex transistors can be eliminated as shown in FIG. 4.

FIG. 5 illustrates a binary coded decimal multiplication table to be reduced by the techniques to produce the read-only memory table for this invention. Referring to FIG. 5, the row and column addresses are listed for 10 segments or partitions of the table (B0-B9). These rows and column addresses are listed in binary. The result of the multiplication of the row number times the column number results in both a 4 bit sum and a 4 bit carry as shown in the table. The BCD multiplier is implemented with the 4 bit multiplier input to the ROW decoder to select one of ten ROW lines (0-9) and the 4 bit multiplicand input to the column decoder to select one of ten columns (0-9). Implementing this same binary coded decimal multiplication table without the extra hexidecimal digits (A through F) requires 800 bits.

Using the ROM compression technique, the columns in FIG. 5 that contain 0's may be eliminated since their output will be the same whether the line in ROM exists or not. In examining FIG. 5, the partition B0 can immediately be eliminated since the 0 in the row will always result in a 0 sum and a 0 carry. This results in a savings of 10 times 8 bits or 80 bits. Likewise, the 0 number in the row for partitions B1 through B9 can be eliminated since that product will always result in a sum 0 and 0 carry. This savings results in 8 bits times 9 partitions or 72 bits savings. In the next step, the remaining partitions of FIG. 5 are examinated to determine which columns in a sum and carry section may be eliminated since the entire column contains only 0's. In partition B1, the carry columns, 4, 3, 2, 1 all contain 0's and may be eliminated. In partition B2, the carry columns 4, 3, 2 and the sum column 1 may be eliminated. In partition B3, the carry columns 4, 3 may be eliminated. In B4, carry columns 4 and 3 and sum column 1 may be eliminated. In partition B5, carry column 4 and sum column 4 and 2 may be eliminated. In partition B6, carry column 4 and sum column 1 may be eliminated. In B7, carry column 4 may be eliminated. In partition B8, carry column 4 and sum column 1 may be eliminated. In partition B9, no columns may be eliminated. The result of this reduction is that the multiplication table in binary coded decimal form may be implemented with a ROM containing only 459 bits of information. Nine lines will be used for the ROW decode and 9 lines will be used for the column decode to result in a ROM multiplier similar to that in FIG. 4. The implementation of 459 bits in the ROM instead of 800 bits in the ROM will result in a 42.6% savings of ROM space. If you consider the implementation of this multiplier using 459 bits in relationship to a full 16×16 matrix ROM of 2,048, the savings is 77.6%. This invention then results in the implementation of a binary coded decimal multiplication look-up table in ROM that provides an increase speed with consideration savings of ROM space.

FIGS. 6A and 6B are is a hexidecimal multiplication table. The same compression technique can be used to used to produce a hexidecimal multiplication look-up table in ROM with a considerable savings in ROM space. In examining FIG. 6, partition H0 may immediately be eliminated since the partition contains 0's for the sum and 0's for the carry and the first row in H1-H15 may be eliminated since this row contains the 0 multiplier for the column. In examining partition H1, carry columns 4,3,2 and 1 may be eliminated. In partition, H2, carry columns 4, 3, 2 and sum column 1 may be eliminated. In partition H3, carry columns 4 and 3 may be eliminated. In H4 carry columns 4, 3 and sum columns 2 1 may be eliminated. In H5 carry column 4 may be eliminated. In H6 carry column 4 and sum column 1 may be eliminated. In H7 carry column 4 may be eliminated. In H8 carry column 4 and sum columns 3, 2 and 1 may be eliminated. In H9 no columns may be eliminated. In H10 sum column 1 may be eliminated. In H11 no columns may be eliminated. In H12 sum columns 2 and 1 may be eliminated. In H13 and H15 no columns may be eliminated. In H14 sum column 1 may be eliminated. Implementating a hexidecimal multiplication table without reduction would require 4 bits for the sum, 4 bits for the carry times the 16 bits for the row number and 16 bits for the column number of for a total of 2,048 bits, using the reduction technique as applied in this invention a total of 638 bits are not required. Therefore the ROM look-up table may be implemented using 1410 bits, resulting in a 31% savings of ROM space.

Figure 7:
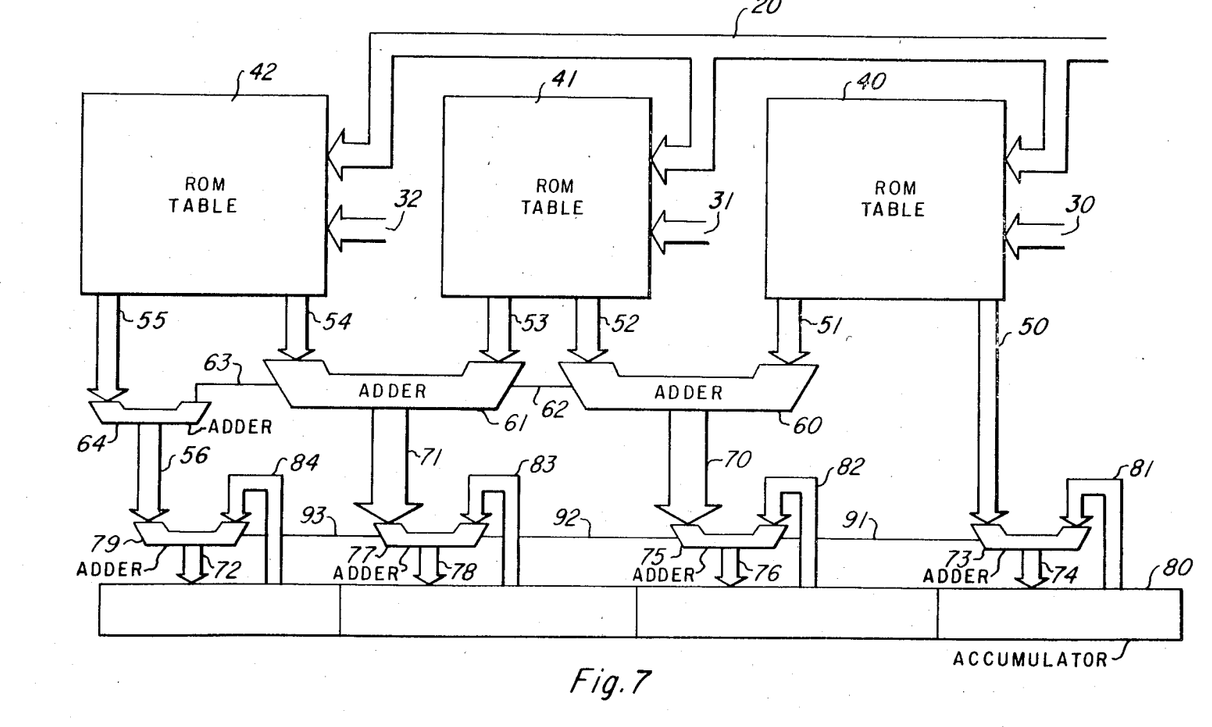
FIG. 7 is a block diagram of a binary coded decimal multiplier.

The actual implementation of this multiplication table is shown in block form in FIG. 7. Since each digit of the multiplier must be multiplied by each digit of the multiplicand, the block diagram in FIG. 7 shows that the least significant digit of the multiplier is input by path 20 to the BCD tables ROM 40, 41 and 42 thus requiring only one ROM row decode for the 3 tables. These BCD tables ROM 40, 41 and 42 are all identical and represent the reduced ROM binary coded decimal multiplication table derived from FIG. 5. Each digit of the multiplicand is input separately to the table. Therefore, in a 3 digit multiply, the least significant digit of the multiplier is placed on path 20 as previously explained and multiplied by the least significant digit of the multiplicand which is placed in path 30, the second least significant bit of the multiplicand placed on path 31 and the most significant digit of the multiplicand placed on path 32. Table 40 will output sum on path 50 and a carry on path 51. Likewise tables 41 and 42 will output sum and carries, respectively. It should be obvious to one skilled in the art that while the diagram illustrated in FIG. 7 is for a 3 digit multiplicand, any digit multiplicand may be implemented by replicating the BCD ROM tables as many times as there are digits in the multiplicand. The carry from ROM 40 is summed by adder 60 with the sum from the ROM table 41 representing the product of the second least significant bit of the multiplicand. The adder 60 includes BCD correction. Thus the carry data in path 51 is summed with the sum data on path 52 to produce a 4 bit total on path 70. In a similar manner, the 4 bit carry data on path 53 from ROM table 41 is summed with the sum data on path 54 from ROM table 42 and adder 61 resulting in a 4 bit sum on lines 71. Line 62 provides a carry bit between adders 60 and 61. A carry and save algorithm could also be implemented to provide a carry bit to the accumulator 80. The carry bit output 63 from adder 61 is combined with the carry digit from ROM 42 via line 55 in adder 64 resulting in the carry digit on line 56. The sum output on line 50 is added to the first digit contents of the accumulator 80 through adder 73 which receives the first digit contents through lines 81. The result is input back to the accumulator 80 via line 74. In a similar manner the other digits of the accumulator 80 are summed via adders 75, 77 and 79. Lines 91, 92 and 93 represent carry bit lines between these adders. When the next digit of the multiplier is input via line 20, the contents of the accumulator 80 should be shifted by one digit. The implentation in FIG. 7 allows for a rapid multiply of a single multiplier digit with a 3 digit multiplicand. It should be obvious to one skilled in the art that this structure may be increased to process instanteously more digits of a multiplicand and may be appropriately stacked (architecturely speaking) to produce instantaneous results from a multigidit multiplier.

Figure 8:
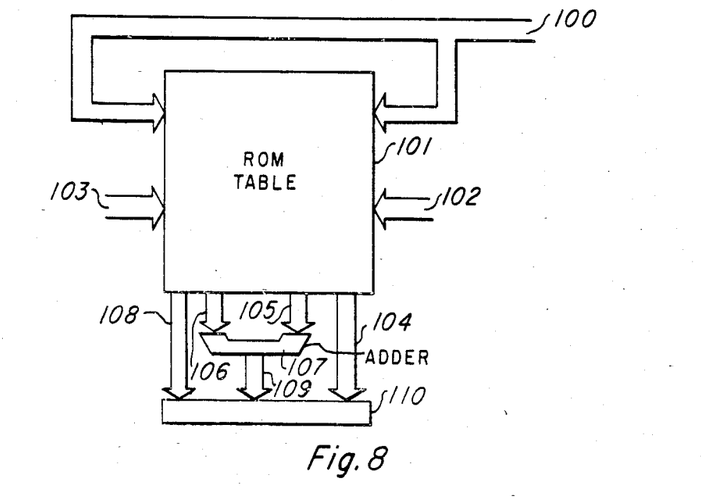
FIG. 8 is a diagram of a single multiplier ROM with a two multiplicand digit input.

A further implementation of the ROM multiplication table look-up technique is illustrated in FIG. 8. FIG. 8 contains a single ROM 101 that is accessed by the single digit of a multiplier on datapaths 100 and the least significant digit of a multiplicand on datapaths 102. The next significant digit of the multiplicand is input on path 103 to the ROM. This ROM is a single ROM but contains two separate column decode circuits connected to the datapaths 102 and 103. In the manner, a single ROM look-up table may provide the two digit output for the two digit multiplicand times the single digit multiplier. The first digit of the product which results from the product of the least significant digit of the multiplicand on datapaths 102 and the multiplier on the row decode lines 100 result in the sum on line 104 and the carry on line 105. The next multiplicand digit on lines 103 result in a product consisting of a sum on lines 106 and the carry on lines 108. The carry on lines 105 and the sum on lines 106 are summed through the adder 107 and input into the register 110 through lines 109 to be combined adjacent to the least significant digit via lines 104 and the most significant digits by line 108. Any carry bit out from adder 107 must be combined with the carry digit on line 108. The significance of this structure is that a single ROM table with a single set of row decode lines can be used to supply two product digits from two multiplicand digits.

Figure 9:
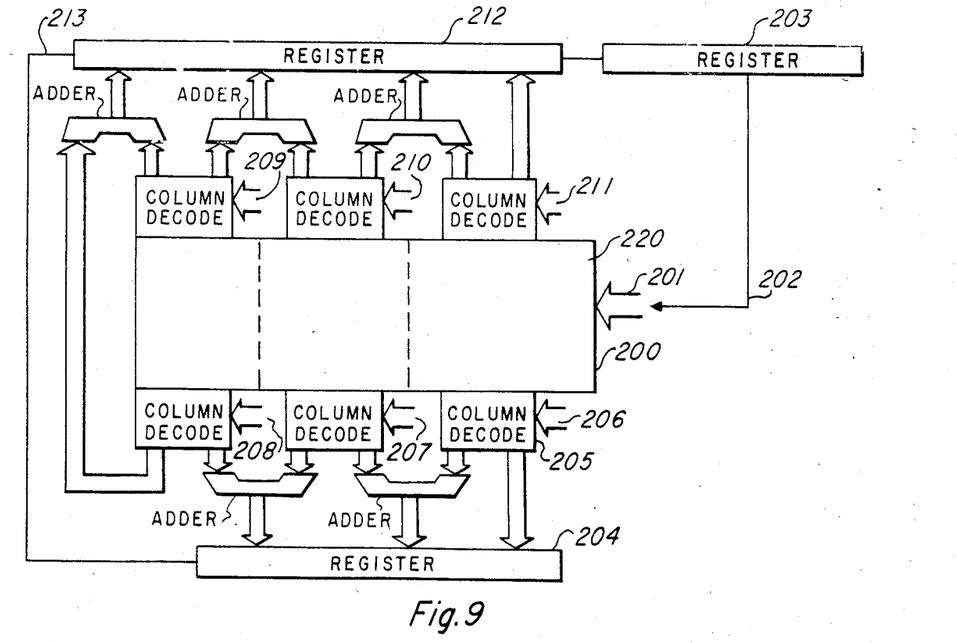
FIG. 9 is a block diagram of a shifting multiplier employing ROM.

By using both sides of the ROM in the manner as illustrated in FIG. 8, a multiplier as shown in FIG. 9 may be implemented. FIG. 7 is a block description of a multiplier using three separate ROM look-up tables shown as 200 that receive a single digit multiplier on lines 201. The multidigit multiplier is actually stored in register 203 and the last significant multiplier digit is transferred into the row decode logic via lines 202 to produce the product that results from the multiplication with (as shown in FIG. 9) a 6 digit multiplicand. Blocks such as 205 represent the column decode circuitry attached to the three sections of the ROM 220. Each digit of the multiplicand is input into the column decode circuitry as shown. For example, the least significant digit of the multiplicand is input on data lines 206. The next consecutive digit is input on lines 207 and the next on 208 and so forth. Note that the result from this multiplication of the single digit multiplier with a multidigit multiplicand is combined in a manner similar to that in FIG. 8. The contents of registers 204 and 212 are actually a single product representing the product of a single digit multiplier on lines 201 and the multidigit multiplicand on lines 206 through 211. When the next successive digit of the multiplier is to be multiplied times the multiplicand, the data in register 204 and 212 are shifted, allowing the most significant digit of the product to be shifted into registers 203. The next successive multiplication of the next successive multiplier digit with the multidigit multiplicand will result in a product that it will be combined, ( i.e., added) with the existing contents of the registers 204 and 212. This structure provides for an efficient use of a reduced ROM in a manner that can handle a multidigit multiplier without having to excessively replicate the contents of the ROM.

What we claim is:

1. In a digital processing system, a multiplier comprising:
  a first input means for receiving at least one multibit multiplicand digit;
  a second input means for receiving at least one multibit multiplier digit;
  a memory means connected to said first and second input means including an array of memory locations disposed in a plurality of rows and a plurality of sets of columns, a row decode means connected to said first input means for selecting a row of said array corresponding to said at least one multiplicand digit, a column decode means connected to said second input means for selecting a set of columns of said array corresponding to said at least one multiplier digit, said array having stored at memory locations of said selected row and said selected set of columns bits corresponding to the product digits of said at least one multiplicand digit and said at least one multiplier digit, said array having less than the total number of memory locations required to specify all bits of said product digits by deletion of any column of memory locations which would be "0" for all rows; and
  an output means connected to said memory means to output the product digits from said memory means for said at least one multiplicand digit and said at least one multiplier digit input.

2. A multiplier as claimed in claim 1, wherein said at least one multiplicand digit, said at least one multiplier digit and said product digits are binary coded decimal digits.

3. A multiplier as claimed in claim 1, wherein said at least one multiplicand digit, said at least one multiplier digit and said product digits are hexidecimal digits.

4. In a digital processing system, a multiplier comprising:
  a first input means for receiving at least one multibit multiplicand digit;
  a second input means for receiving a first multibit multiplier digit;

a third input means for receiving a second multibit multiplier digit;

a memory means connected to said first, second and third input means including an array of memory locations disposed in a plurality of rows and a plurality of sets of columns, a row decode means connected to said first input means for selecting a row of said array corresponding to said at least one multiplicand digit, a first column decode means connected to said second input means for selecting a set of columns of said array corresponding to said first multiplier digit, a second column decode means connected to said third input means for selecting a set of columns of said array corresponding to said second multiplier digit, said array having stored at memory locations of said selected row and a selected set of columns bits corresponding to the product digits of said at least one multiplicand digit and respective first and second multiplier digits, said array having less than the total number of memory locations required to specify all bits of said product digits by deletion of any column of memory locations which would be "0" for all rows;

a first output means connected to said memory means to output the product digits from said memory means for said at least one multiplicand digit and said first multiplier digit input; and a second output means connected to said memory means to output the product digits from said memory means for said at least one multiplicand digit and said second multiplier digit input.

5. A multiplier as claimed in claim 4, wherein said at least one multiplicand digit, said first and second multiplier digits and said product digits are binary coded decimal digits.

6. A multiplier as claimed in claim 4, wherein said at least one multiplicand digit, said first and second multiplier digits and said product digits are hexidecimal digits.

7. In a digital processing system, a multiplier comprising:

a first register means for storing a multiple digit multiplicand;

a first input means connected to said first register means for receiving a predetermined digit stored in said first register means;

a plurality of second input means each for receiving one multiplier digit;

a memory means connected to said first input means and said plurality of second input means including a plurality of arrays of memory locations disposed in a plurality of rows and a plurality of sets of columns, a row decode means connected to said first input means for selecting a row of each of said arrays corresponding to said multiplicand digit, a plurality of column decode means each connected to a corresponding one of said second input means for selecting a set of columns of one of said arrays corresponding to said multiplier digit, each of said arrays having stored at memory locations of said selected row and said selected set of columns bits corresponding to the product digits of said multiplicand digit and said corresponding multiplier digit, said array having less than the total number of memory locations required to specify all bits of said product digits by deletion of any column of memory locations which would be "0" for all rows;

a plurality of output means each connected to a corresponding array of said memory means to output the product digits from said memory means for said at least one multiplicand digit and said corresponding multiplier digit input;

a second register means for storing a plurality of digits; and a control means connected to said first and second register means and said output means for sequentially shifting digits of said first and second register means, thereby sequentially shifting digits of said multiplicand into said first input means, and combining said product digits of said plurality of output means with the previous contents of said second register means.

8. A multiplier as claimed in claim 7, wherein each digit of said multiplicand, each multiplier digit and said product digits are binary coded decimal digits.

9. A multiplier as claimed in claim 7, wherein each digit of said multiplicand, each multiplier digit and said product digits are hexidecimal digits.

* * * * *